United States Patent
Kalem et al.

(10) Patent No.: US 6,807,497 B2
(45) Date of Patent: Oct. 19, 2004

(54) LASER MEASUREMENT SYSTEM WITH DIGITAL DELAY COMPENSATION

(75) Inventors: Lee Charles Kalem, Los Gatos, CA (US); David Todd Dieken, Santa Clara, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 362 days.

(21) Appl. No.: 10/022,407

(22) Filed: Dec. 17, 2001

(65) Prior Publication Data

US 2003/0115004 A1 Jun. 19, 2003

(51) Int. Cl.[7] .............................................. G01R 13/00
(52) U.S. Cl. ...................... 702/72; 702/77; 702/106; 702/32; 702/69; 702/79; 73/657; 324/233; 324/521; 324/617; 324/622; 324/66; 324/76.52; 356/10; 356/19; 356/349; 356/358
(58) Field of Search .............................. 702/32, 69, 72, 702/77, 79, 106; 358/10, 19; 356/349, 358; 324/233, 521, 617, 622, 66, 76.52; 73/657

(56) References Cited

U.S. PATENT DOCUMENTS

| | | | |
|---|---|---|---|
| 3,816,834 A | | 6/1974 | Wilson |
| 4,587,551 A | * | 5/1986 | Penney ....................... 348/194 |
| 4,688,940 A | * | 8/1987 | Sommargren et al. ...... 356/487 |
| 5,249,030 A | * | 9/1993 | Field et al. ................. 356/487 |
| 5,757,972 A | * | 5/1998 | Murayama .................. 382/242 |
| 5,767,972 A | | 6/1998 | Demarest |
| 5,953,690 A | | 9/1999 | Lemon et al. |
| 2001/0028679 A1 | | 10/2001 | Chou |

* cited by examiner

Primary Examiner—John Barlow
Assistant Examiner—Aditya Bhat

(57) ABSTRACT

A method and system for determining and compensating for phase and time errors in an optical receiver. The method and system includes use of a measurement and reference signal; deriving phase and time errors; and providing compensation values to the optical receiver. The operating frequency and/or other operating parameters associated with phase and time errors are determined and recorded to allow for proper compensation to the optical receiver.

15 Claims, 4 Drawing Sheets

LASER MEASUREMENT SYSTEM WITH DIGITAL DELAY COMPENSATION

BACKGROUND OF THE INVENTION

1. Field of the Invention

The invention relates to optical measurement systems and, more particularly, to a technique for empirically determining the delay characteristics of an optical receiver, storing those characteristics as digital data, and using the data to effect phase compensation in a measurement process.

2. Description of the Related Art

Laser interferometry systems are designed to measure distance and, derivatively, motion with exceptional accuracy. A typical laser interferometer architecture uses doppler-shifted laser signals in such a way that the phase difference between a reference signal and a measured signal is equivalent to an absolute position, minus a fixed offset. Consequently, any non-static delay in the measurement causes an error in the position data reported by the system. Compensation for a small constant delay in the measurement may be achieved with known methods, but an uncompensated delay change with respect to input frequency, input signal power, or system temperature will cause a position error. If the quantitative relationship between phase delay and any of these parameters can be measured during final product testing of the measurement system, compensation may be possible.

In a laser interferometer system, the device that converts the optical signal from the laser to an electrical signal is referred to as a "receiver." This electrical signal is then sent to a digital phase measurement device, called an "axis card" or "phase measurement card." An axis card may have multiple channels, or axes, of measurement.

Heretofore, methods for compensating for non-static receiver delay have used trimpot-based analog circuits in order to cancel first-order phase errors of the receiver circuitry. The trimpots are adjusted by a technician in final production test Although useful for compensating for phase errors that result from latitude in component tolerances, this technique requires an excessive number of trimpots to compensate for all sources of phase error.

An additional source of error in interferometric position measurements originates with the differences in the fixed delays between the measured signal path and reference signal path. The sources of the fixed delays are numerous and include, for example: cable lengths, optical path lengths, photoelectric detector delay, circuit delay, and phase meter offset. The effects of these fixed delays constitute differences in the "data age" of the measurement. That is, "data age" delay derives from the elapsed time between the event representing the position measurement, and the availability of the position data to the user. Compensation for these fixed delays by adjusting one or more of the same fixed delays is generally impracticable. Compensation for these fixed delays in the prior art methods requires knowledge of the velocity of the object whose position is being measured, as well as the delay in each measured axis. An approach to this source of measurement error is described in U.S. Pat. No. 5,767,972, Method and Apparatus for Providing Data Age Compensation in an Interferometer.

In addition, those skilled in the art of laser measurement techniques recognize that the delay that is attributable to the receiver itself is a function of a number of operating parameters, including, inter alia, input frequency, signal power, and temperature, due to the nature of the receiver electronics. Furthermore, the specific manner in which receiver delay varies with applicable operating parameters varies from receiver to receiver.

Accordingly, what is desired is a technique that enables a far greater range of non-static delay compensation than previous techniques using analog means. In particular, a technique that eliminates the need for analog trimpots would be welcome. Because phase delay may be expected to vary as a function of one or more operating parameters of the receiver, a significant performance improvement will be realized if the delay compensation can be made to track, or correlate to, variations in the relevant operating parameter(s). Also, to the extent that compensation data is presented in digital form, the data can be stored on the receiver, with little or no user interaction, thereby simplifying final test procedure. Also, it is common for optical measurement systems to be partitioned so that an optical receiver module is physically distinct and separable from an associated measurement module, thereby enabling the respective receiver and measurement modules to be separated and changed out for maintenance, repair or troubleshooting purposes. Consequently, system flexibility may be preserved if the delay compensation technique facilitates the interoperability of numerous receivers of the same kind with numerous measurement modules of the same kind.

SUMMARY OF THE INVENTION

What is needed and is disclosed herein is an invention that provides for a method and a system to determine and keep track of phase and time difference errors in an optical receiver and provide for proper compensation values to make up for such errors.

In an embodiment of the invention a first cycle of a measured signal of the optical receiver is measured. A reference receiver outputs a reference signal whose first cycle is measured. A reference or system clock is used to measure a time value of the next subsequent cycle of the measured signal to the next pulse of the system clock, and the next subsequent cycle of the reference signal to the next pulse of the reference clock. The time period of the measured signal to the next pulse of the system clock is divided by the cycle of the measured signal, and the time period of the reference signal to the next pulse of the system clock is divided by the cycle of the reference signal. The difference between the two quotients calculated from the respective division calculation is correlated as phase error.

In certain embodiments of the invention the quotient derived from the measured signal is calculated as a first derivative over time to determine a frequency value. The subsequent frequency value can be correlated with the phase error in a lookup table or similar memory application.

In other embodiments of invention, a second phase error is calculated by calculating a second position value. The second position value is derived by calculating a second set of time values measured respectively from the next subsequent cycle of the measured signal, and the next subsequent cycle of the reference signal to the clock pulse following the next subsequent clock pulse. The second set of values are divided by the respective cycle values. The difference of resulting values are derived and treated as position or phase error.

In yet other embodiments of the invention time difference errors are calculated by taking the time of a measured signal to subsequent clock pulse, taking the time of a reference signal to a subsequent clock pulse, and calculating the difference between the two times. The time difference can be associated with operating parameters such as a frequency and stored in a lookup table or similar memory application.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and it's numerous objects, features and advantages made apparent to those skilled in the art by referencing the accompanying drawings, in which.

The use of the same reference number throughout the drawings designates a like or similar element.

Figure 1:
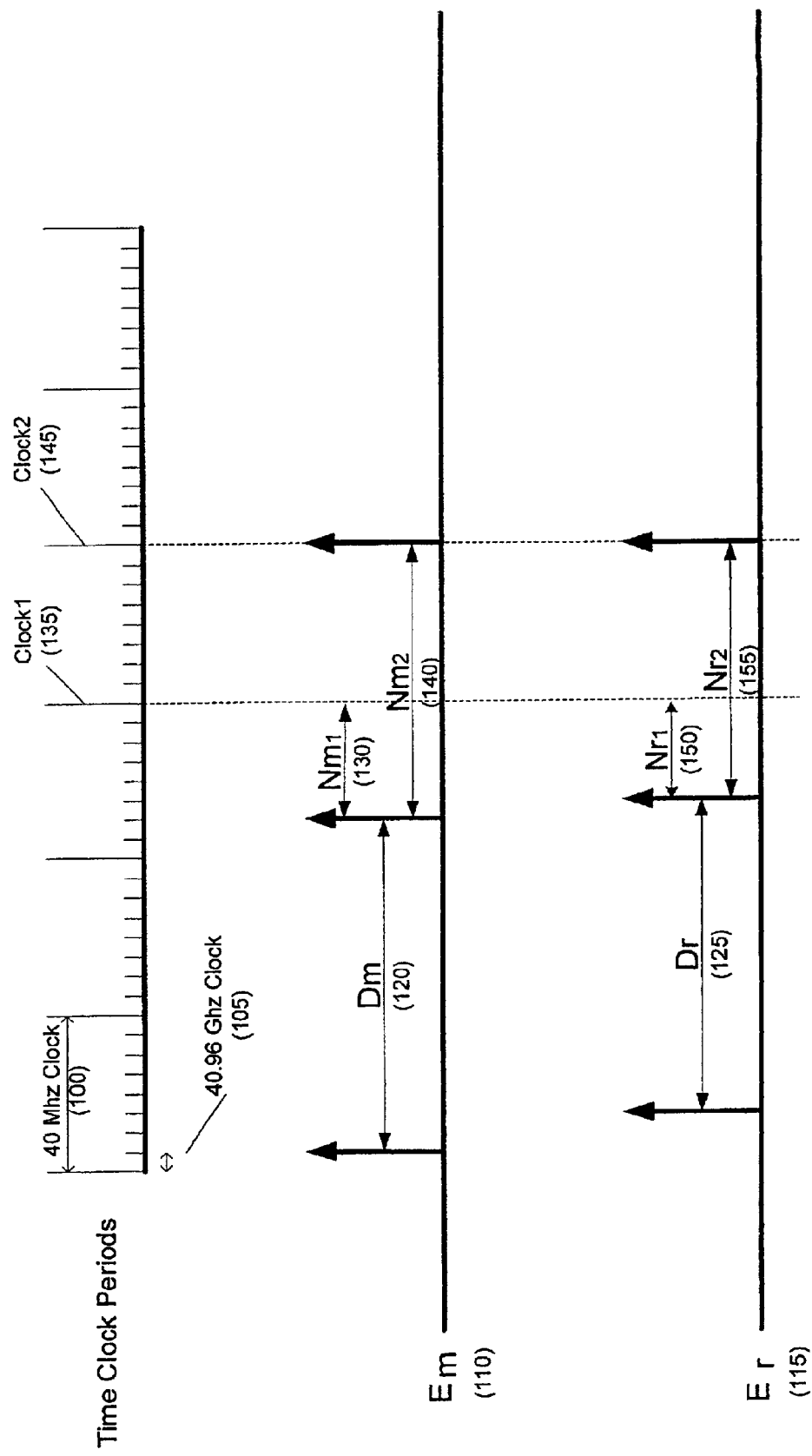
FIG. 1 is a graphical representation of the manner in which the phase difference between a measured signal and a reference signal is computed using interpolative techniques.

While the invention is susceptible to various modifications and alternative forms, specific embodiments thereof are shown by way of example in the drawings and will herein be described in detail, it should be understood, however, that the drawings and detailed description are not intended to limit the invention to the particular form disclosed. On the contrary, the intention is to cover all modifications, equivalents, and alternatives falling within the spirit and scope of the present invention as defined by the appended claims.

DETAILED DESCRIPTION

The following is intended to provide a detailed description of an example of the invention and should not be taken to be limiting of the invention itself. Rather, any number of variations may fall within the scope of the invention which is defined in the claims following the description.

Introduction

In a manner that will be made clear in the following portions of this detailed description, the invention is a technique for effecting compensation of receiver phase and time errors in an optical measurement system. In essence, phase and time error of the receiver as a function of, for example, the receiver operating frequency is empirically determined during production of the measurement system. The compensation data is written in digital form into a lookup table. The compensation data is combined with the digital phase and time measurement so as to effect a substantial degree of correction of the phase and time measurement.

Position Calculation

Referring now to FIG. 1, illustrated is a graphical representation of the manner in which the phase difference between a measured signal and a reference signal is computed using interpolative techniques. In a particular embodiment of the invention, a 40 Mhz clock (clock signal) 100 provides system or reference clock signals which translates to reference incremental time periods of $2.5 \times 10^{-8}$ seconds. 40.96 Ghz clock (clock signal) 105 provides incremental time periods of $2.44 \times 10^{-11}$ seconds.

The graphical representation of FIG. 1 is representative of measurements over certain instances of time. In embodiments of the invention, measurement is made over real-time with continuous measurements of inputs and outputs relating to phase, time, and position.

Square wave signal representing measurement, $E_m$ 110, are represented by signal pulses that are measured on the rising edge of the signal, and include pulses 110a, 110b, and 110c. Square wave signals representing reference, $E_r$ 115, are represented by signal pulses that are measured on the rising edge of the signal, and include pulses 115a, 115b, and 115c. $E_m$ 110 and $E_r$ 115 are timed against clock signal 100 and clock signal 105.

The time of denominator $D_m$ 120 is measured from a first rising edge or pulse 110a of square wave $E_m$ 110 to a second rising edge or pulse 110b of square wave $E_m$ 110. The time of denominator $D_r$ 125 is measured from a first rising edge or pulse 115a of square wave $E_r$ 115 to a second rising edge or pulse 115b of square wave $E_r$ 115.

Numerator $N_{m1}$ 130 is measured from pulse 110b of square wave $E_m$ 110 to a "clock 1" 135 pulse signal. Numerator $N_{m2}$ 140 is measured from pulse 115b of square wave $E_m$ 110 to a "clock 2" 145 pulse signal. Pulse signals "clock 1" 135 and "clock 2" 145" are periodic clock pulses of 40 Mhz clock 100. Numerator $N_{r1}$ 150 is measured from pulse 115b of square wave $E_r$ 115 to "clock 1" 135 pulse signal. Numerator $N_{r2}$ 155 is measured from pulse 115b of square wave $E_r$ 115 to "clock 2" 145 pulse signal. With the measured values the following calculations are made to determine respective quotient ($Q_{m1}$, $Q_{r1}$, $Q_{m2}$, and $Q_{r2}$) and position (Position$_1$ and Position$_2$) values.

$$Q_{m1} = N_{m1}/D_m$$

$$Q_{r1} = N_{r1}/D_r$$

$$Q_{m2} = N_{m2}/D_m$$

$$Q_{r2} = N_{r2}/D_r$$

$$\text{Position}_1 = (Q_{m1} - Q_{r1})$$

$$\text{Position}_2 = (Q_{m2} - Q_{r1})$$

Figure 2:
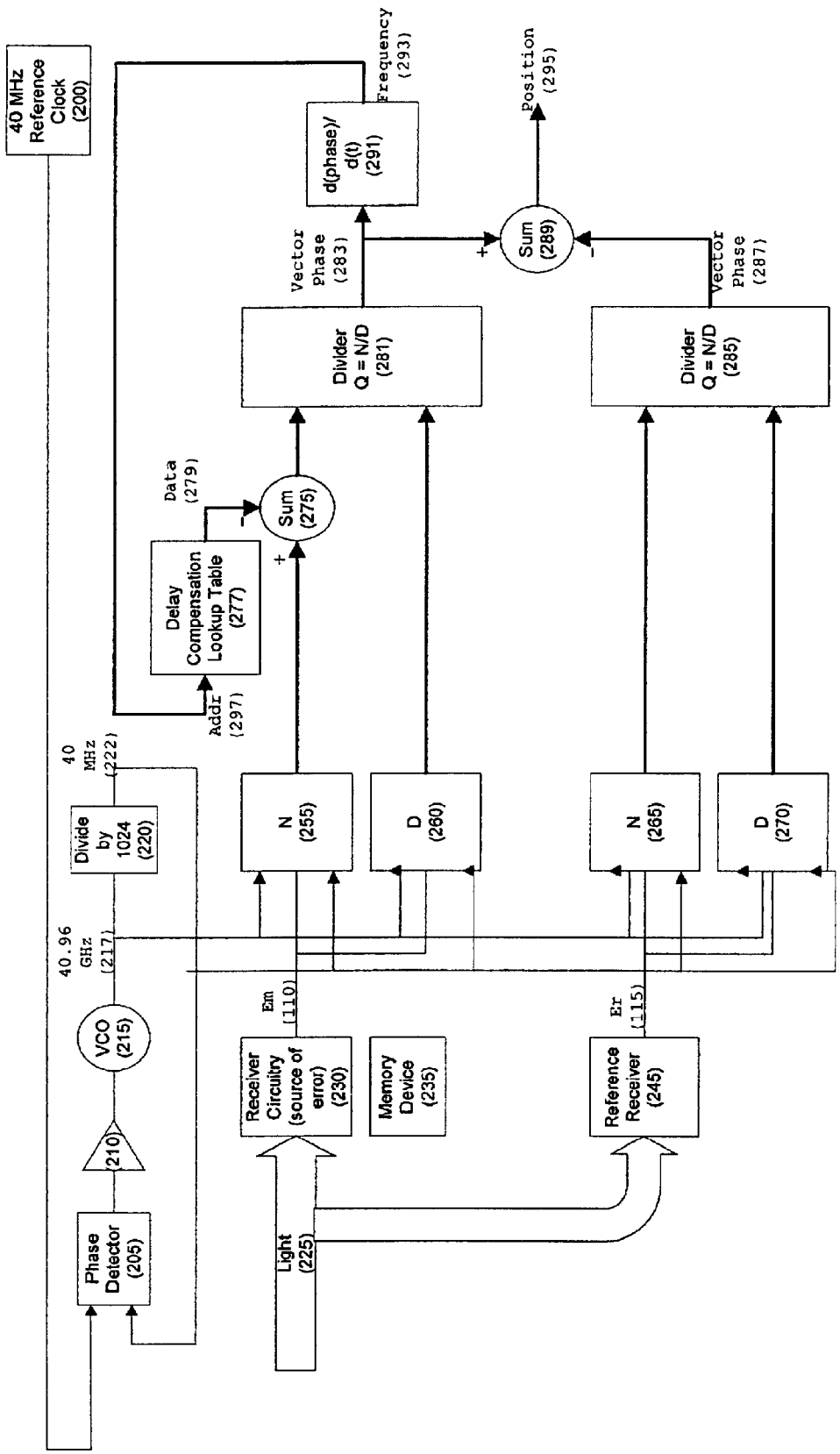
FIG. 2 is a high-level block diagram of a phase measurement system in which phase compensation is added to a measurement channel.

Non-static differential phase error in either measurement square wave $E_m$ 100 or reference square wave $E_r$ 115 appears as measurable position values Position$_1$ or Position$_2$ Phase Compensation Circuitry Referring now to FIG. 2 illustrated is a high-level block diagram of a phase measurement system in which phase compensation is added to a measurement channel in accordance with one embodiment of the invention. In this particular embodiment of the invention, the phase measurement system includes an optical receiver, and measures, records and compensates for phase errors. The phase measurement system measures motion or position in real-time translating into inputs and outputs (phase and position) which continue indefinitely.

Reference or system clock 200 provides a 40 Mhz reference time period that is received by phase detector 205. The output of phase detector 205 is passed to linear operational amplifier (op amp) 210. Output of op amp 210 passes to voltage controlled oscillator (VCO) 215. In practice phase detector 205, op amp 210, and VCO 215 make up a typical phase locked loop (PLL) circuit. In this particular embodiment, the use of phase detector 205, op amp 210, and VCO 210 (or similar PLL circuit) are used to lock the phase of the 40 MHz and 40.96 GHz clocks. From VCO 215 (or similar PLL circuit), 40.96 GHz clock signal 217 is provided. Clock signal 217 provides a measurable amount of time whose time period is incrementally small enough for accurate calculations. Clock signal 217 is divided by 1024 by block 220 and provides a system or reference 40 MHz clock signal 222. In alternative embodiments 40.96 GHz clock signal 217 is not actually created, but a 640 MHz clock and a ring oscillator can be used to provide an equivalent function. Other methods of providing clock signals and other combinations of different clock frequency pairs are also possible.

Light input 225 is received by the phase measurement system. Optical receiver 230 receives light input 225. Optical receiver 230 is expected to have some measurement error. Those experienced in the design of optical measurement systems understand that one aspect of the operation of optical receivers, such as optical receiver 230, is the unavoidable introduction of some degree of phase error. Optical receiver 230 introduces a degree of phase shift between the signal applied at its input and the signal that appears at the output. As is well known, phase error introduced by optical receiver 230 will likely depend on a number of operating parameters, such as the operating frequency of optical receiver 230, ambient temperature and input power. Such operating parameters can be set during production of optical receiver 230 and recorded against measurement error; however, measurement error must be determined, recorded, and compensated for to provide a true and accurate position measurement.

In accordance with one aspect of the invention, optical receiver 230 can include non-volatile memory device 235 that stores data that defines the empirically determined relationship between optical receiver 230's operating parameters, and measurement error, in particular phase error. For the purpose of conveying an understanding of the invention, it may be assumed that non-volatile memory device 235 stores data that defines the manner in which the phase error attributed to optical receiver 230 varies with the operating frequency. In certain embodiments of the invention, optical receiver 230 and memory device 235 are coupled to one another, and are considered as one device block 237. Optical receiver 230 (or device block 237) outputs square wave $E_m$ 110.

Reference receiver 245 receives light input 225 and outputs square wave $E_r$ 115. Reference receiver 245 has been calibrated using compensation circuitry or other methods therefore reference receiver 245 provides an ideal square wave $E_r$ 115. Square wave $E_r$ 115 is assumed to have no phase error.

Block 255 performs the process for derivation of numerator $N_m$ based on clock signals 217 and 222, and square wave $E_m$. Specifically time values for numerators $N_{m1}$ 130 and $N_{m2}$ 140 are derived. The values of numerators $N_{m1}$ 130 and $N_{m2}$ 140 are distinguished from one another by reference 40 MHz clock signal 222.

Block 260 performs the process for derivation of denominator $D_m$ 120. Block 260 receives clock signals 217 and 222, and square wave $E_m$ 110 signal to derive denominator $D_m$ 120.

Block 265 performs the process for derivation of numerator $N_r$ based on clock signals 217 and 222, and square wave $E_r$. Specifically time values for numerators $N_{r1}$ 150 and $N_{r2}$ 155 are derived. The values of numerators $N_{r1}$ 150 and $N_{r2}$ 155 are distinguished from one another by reference 40 MHz clock signal 222.

Block 270 performs the process for derivation of denominator $D_r$ 270. Block 270 receives clock signals 217 and 222, and square wave $E_r$ 115 signal to derive denominator $D_r$ 270.

Block 281 performs the process for quotient $Q_m$, in particular quotients $Q_{m1}$ and $Q_{m2}$. The output of block 281 is vector phase value 283 and received by block 291. Block 291 performs the process to determine the derivative of phase over time. Block 291 can include frequency computation circuits employing the mathematical first derivative of phase over time to determine frequency.

Frequency data 293 of block 291 is coupled to ADDR input 297 of lookup table 277. DATA output 279 of look up table 277 is applied as an input to summing circuit 275.

Although process 291 computes the operating frequency of optical receiver 230 by taking the mathematical first derivative of the output of process 281, those skilled in the art understand that other techniques can be employed. Operating frequency information can be derived from other sources in the optical measurement system, including tuning control signals applied to or developed by optical receiver 230. Whatever the source, frequency data 293 are correlated as ADDR input 297 of lookup table 277.

Depending on the syntax of the frequency data 293, frequency data 293 can operate directly as address information in the form applied to lookup table 277. However, as a more general proposition, frequency data 293 can require some form of logical translation. If so, address conversion logic can be coupled between the output of process 291 and ADDR input 297 of lookup table 277. Alternatively, but equivalently, any required frequency-to-address logic may be integrated into the lookup table itself as a function of receiver operating frequency.

Known phase error data in lookup table 277 is combined from (i.e., added to or subtracted) the digital value at the output of block 255 so that a corrected value is applied to input of block 281. It is to be understood that in practical implementation of the invention, the value applied to input of block 281 may not necessarily be ideally or perfectly corrected in the sense that all error has been compensated. Phase error is compensated in the sense that a significant portion of the phase error attributable to optical receiver 230, as it depends on at least one operating parameter of optical receiver 230, has been eliminated.

In particular embodiments of the invention, lookup table 277 is included as part of or directly coupled to memory device 235.

In the optical measurement system, summing circuit 289 receives vector phase 283 and vector phase 287. Position value 295 represents the desired true measurement value that a properly calibrated and compensated optical receiver 230 would measure and output.

Phase error of optical receiver 230 is stored in lookup table 277. Phase error data is selectively accessed in accordance with frequency information, and is applied from the DATA output 279 of lookup table 277 to summing circuit 275.

Process blocks previously described, such as blocks 255, 260, 265, 270, 281, 285, and 291 can be performed by application specific integrated circuits (ASIC) or similar hardware, firmware, or software based related devices. It is also contemplated that the various process blocks and circuits can be integrated with one another, or have similar logical process blocks perform similar functions.

Optical Receiver

Figure 3:
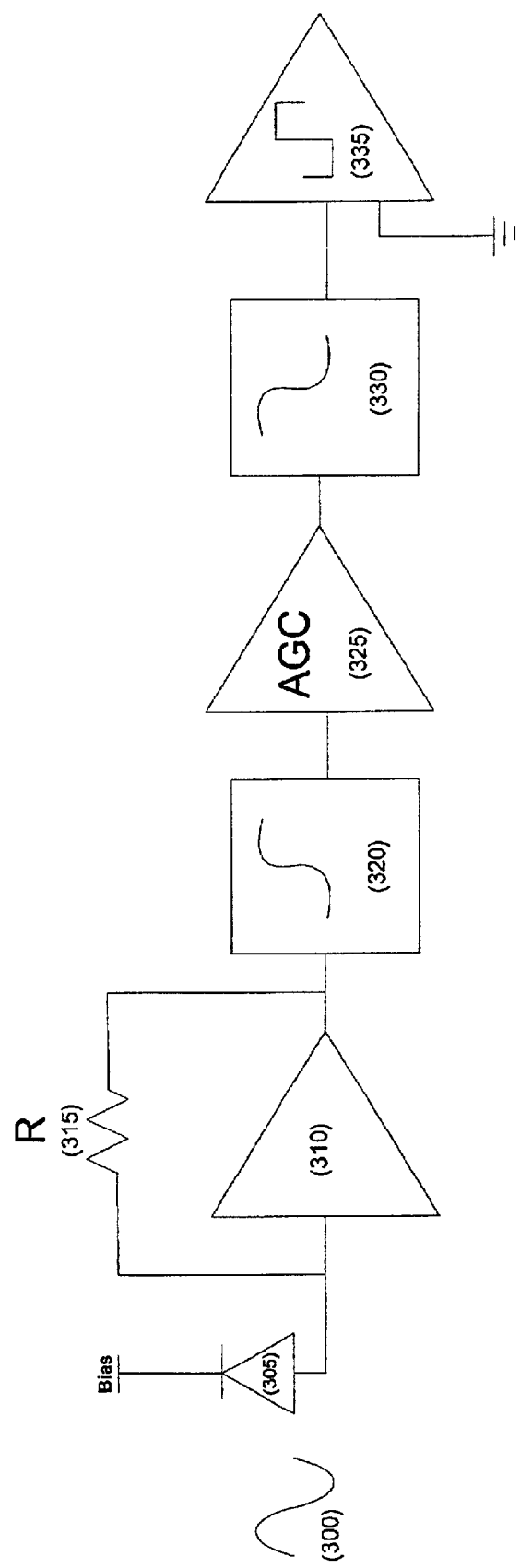
FIG. 3 is a block diagram of an optical receiver that may be used as a component of an optical measurement system that also includes a measurement module.

Referring now to FIG. 3, illustrated is a block diagram of a more or less conventional optical receiver design. Optical receiver receives optical or light signal 300. Optical receiver includes photodiode 305 coupled to transimpedance amplifier 310. Transimpedance amplifier 310 includes feedback resistor R 315 coupled from transimpedance amplifier 310 output to transimpedance amplifier 310 input. Optical receiver also includes high-pass filter 320 at the output of transimpedance amplifier 310 and low-pass filter 330 at the output of automatic gain control (AGC) block 325. High-pass filter 320 and low-pass filter 330 define the passband of the optical receiver. Comparator 350 at the receiver output stage causes a square-wave to appear at the optical receiver output. Other examples of optical receiver designs may be found in U.S. Pat. No. 5,455,705, Transimpedance Amplifier for Optical Receiver and U.S. Pat. No. 5,382,920, Circuit Arrangement for an Optical Receiver. The specific design of optical receiver 110 is not itself considered to be an aspect of the invention. The invention may be used in connection with optical receivers that exhibit various design characteristics.

Time Compensation Circuitry

Figure 4:
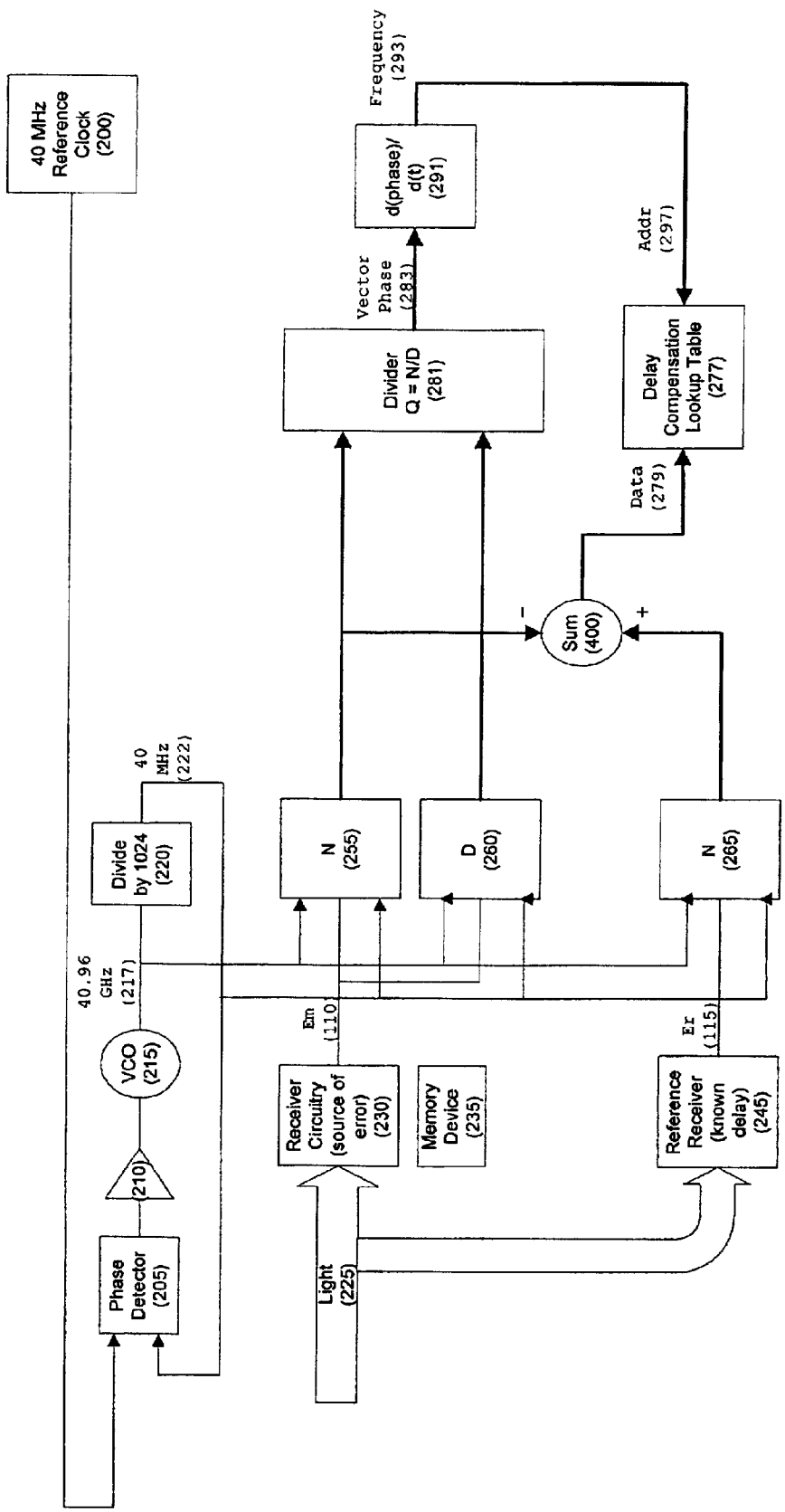
FIG. 4 is a high-level block diagram of a phase measurement system in which time error of an optical receiver is measured.

Now referring to FIG. 4, illustrated is a high-level block diagram of a phase measurement system in which time error of an optical receiver is measured. In this embodiment of the invention, time error is measured as opposed to phase error that is illustrated in FIG. 2. Numerator values are equated to time error, as opposed to quotient values being equated to phase error.

In this particular embodiment of the invention, a determination is made as to the difference between numerator values of the optical receiver 230 and reference receiver 245. The differences in numerator values equate to values in time differences between optical receiver 230 and reference receiver 245.

Specifically the values of numerator $N_m$ ($N_m$ and $N_{m2}$) are compared against the values of numerator $N_r$ ($N_{r1}$ and $N_{r2}$). Summing circuit 400 receives the respective numerator values and determines differences and outputs the result as time error data 405 to lookup table 277. Time error data 405 is correlated to particular frequency values stored as ADDR data 297. As previously discussed ADDR data 297 is an address translation of frequency value 293. In this embodiment of the invention, lookup table 277 can be coupled to or be part of memory device 235, where memory device 235 is coupled to optical receiver 230.

Accordingly, it is apparent from the above detailed description that the present invention has been described in connection with several embodiments and that the invention is not intended to be limited to the specific detailed embodiments set forth herein. On the contrary, the invention comprehends such alternatives, modifications, and equivalents as can be reasonably included within the spirit and scope, literal and equivalent, of the invention as defined by the appended claims.

For example, although the invention is described here in the context of an optical measurement system, in which a phase and time separation between a reference signal and a measured signal is ultimately converted into a spatial measure, it is clear the invention is applicable to numerous signal processing operations in which phase and time measurement are implicated. The essence of the invention is simply a technique to effect correction or compensation for upstream phase and time errors. Compensation data is digitally stored, as a function of one or more operating parameters of the measurement system, and is locally available to the measurement circuitry. If the uncompensated measurement is presented in digital form, then the digital correction information is conveniently combined with the uncompensated measurement. Should measurement be made in an analog environment, the digitally stored compensation data need only be passed through a D/A converter prior to an analog error compensation step.

What is claimed is:

1. A method of computing phase difference between a measured signal and a reference signal, the method comprising:

measuring a first cycle of the measured signal to arrive at a first denominator;

measuring a first cycle of the reference signal to arrive at a second denominator;

calculating a time after the first cycle of the measured signal and a subsequent pulse of a reference clock signal to arrive at a first numerator;

calculating a time after the first cycle of the reference signal and the subsequent pulse of the reference clock signal to arrive at a second numerator;

dividing the first numerator by the first denominator to arrive at a first quotient;

dividing the second numerator by the second denominator to arrive at a second quotient; and deriving a difference between the first and second quotients to arrive at a first position value, wherein the position value translates to a first phase difference.

2. The method of computing phase difference between a measured signal and a reference signal of claim 1, the method further comprising:

computing a derivative of the first quotient over time to arrive at a first frequency value.

3. The method of computing phase difference between a measured signal and a reference signal of claim 2, the method further comprising:

correlating the first phase difference to the first frequency value in a lookup table.

4. The method of computing phase difference between a measured signal and a reference signal of claim 1, the method further comprising:

calculating a time after the first cycle of the measured signal and a pulse following the subsequent pulse of a reference clock signal to arrive at a third numerator;

calculating a time after the first cycle of the reference signal and the pulse following the subsequent pulse of the reference clock signal to arrive at a fourth numerator;

dividing the third numerator by the first denominator to arrive at a third quotient;

dividing the fourth numerator by the second denominator to arrive at a fourth quotient; and deriving a difference between the third and fourth quotients to arrive at a second position value, wherein the second position value translates to a second phase difference.

5. The method of computing phase difference between a measured signal and a reference signal of claim 4, the method further comprising:

computing a derivative of the third quotient over time to arrive at a second frequency value.

6. The method of computing phase difference between a measured signal and a reference signal of claim 5, the method further comprising:

correlating the second phase difference to the second frequency value in the lookup table.

7. A method of computing time difference between a measured signal and a reference signal, the method comprising:

measuring a first cycle of the measured signal to arrive at a first denominator;

calculating a time after the first cycle of the measured signal and a subsequent pulse of a reference clock signal to arrive at a first numerator;

calculating a time after the first cycle of the reference signal and the subsequent pulse of the reference clock signal to arrive at a second numerator; and deriving a difference between the first and second numerators to arrive at a first time difference value.

8. The method of computing time difference between a measured signal and a reference signal of claim 7, the method further comprising:

dividing the first numerator by the first denominator to arrive at a first quotient; and computing a derivative of the first quotient over time to arrive at a first frequency value.

9. The method of computing time difference between a measured signal and a reference signal of claim 8, the method further comprising:

correlating the first time difference value to the first frequency value in a lookup table.

10. A method of computing phase difference between a measured signal and a reference signal, the method comprising:

receiving the measured signal from a first receiver wherein the measured signal provides a pulse on each cycle;

generating a reference clock signal and a measurement clock signal;

receiving the reference signal from a second receiver wherein the reference signal provides a pulse on each cycle;

calculating a measurement denominator value based on a first pulse and a succeeding second pulse of the measured signal wherein the value is calculated against the measurement clock signal;

calculating a measurement numerator value based on the second pulse of the measured signal and a next succeeding pulse of the reference clock signal;

deriving a measurement quotient value by dividing the measurement numerator value by the measurement denominator value;

calculating a reference denominator value based on a first pulse and a succeeding second pulse of the reference signal wherein the value is calculated against the measurement clock signal;

calculating a reference numerator value based on the second pulse of the reference signal and a next succeeding pulse of the reference clock signal;

deriving a reference quotient value by dividing the reference numerator value by the reference denominator value; and calculating a difference between the measurement quotient value and the reference quotient value to arrive at a position value, wherein the position value relates a phase difference.

11. The method of computing phase difference between a measured signal and a reference signal of claim 10 further comprising:

deriving a derivative of the measurement quotient as a function of phase over time and determining an operating frequency; and relating the operating frequency to the phase difference.

12. The method of computing phase difference between a measured signal and a reference signal of claim 11 further comprising:

storing the operating frequency and the phase difference in a lookup table.

13. A method of computing time difference between a measured signal and a reference signal, the method comprising:

receiving the measured signal from a first receiver wherein the measured signal provides a pulse on each cycle;

generating a reference clock signal and a measurement clock signal;

receiving the reference signal from a second receiver wherein the reference signal provides a pulse on each cycle;

calculating a measurement denominator value based on a first pulse and a succeeding second pulse of the measured signal wherein the value is calculated against the measurement clock signal;

calculating a measurement numerator value based on the second pulse of the measured signal and a next succeeding pulse of the reference clock signal;

deriving a measurement quotient value by dividing the measurement numerator value by the measurement denominator value;

calculating a reference numerator value based on the second pulse of the reference signal and a next succeeding pulse of the reference clock signal;

calculating a difference between the measurement numerator value and the reference numerator value to arrive at a time difference value.

14. The method of computing time difference between a measured signal and a reference signal of claim 13 further comprising:

deriving a derivative of the measurement quotient as a function of phase over time and determining an operating frequency; and relating the operating frequency to the time difference value.

15. The method of computing time difference between a measured signal and a reference signal of claim 14 further comprising:

storing the operating frequency and the time difference in a lookup table.

* * * * *